United States Patent [19]
Gage et al.

[11] 4,303,089
[45] Dec. 1, 1981

[54] STEERING INCLUDING ACCUMULATOR FOR SUPPLYING EMERGENCY RESERVE OF FLUID

[75] Inventors: Douglas M. Gage, Dubuque, Iowa; Warren L. Thompson, Galena, Ill.

[73] Assignee: Deere & Company, Moline, Ill.

[21] Appl. No.: 196,199

[22] Filed: Oct. 14, 1980

[51] Int. Cl.³ .............................................. B62D 5/08
[52] U.S. Cl. ..................................... 137/113; 60/328; 60/404; 91/28; 137/110; 137/554; 180/133
[58] Field of Search ........................ 60/328, 404, 405; 91/28; 180/133; 137/110, 113, 114, 554; 251/63.4; 340/626

[56] References Cited
U.S. PATENT DOCUMENTS

| | | | |
|---|---|---|---|
| 1,834,596 | 12/1931 | Clapp | 251/63.4 X |
| 3,882,952 | 5/1975 | Crabb | 60/404 X |
| 4,134,573 | 1/1979 | Messinger | 251/324 |
| 4,149,379 | 4/1979 | Shimizu | 60/404 |
| 4,160,490 | 7/1979 | Bexten | 180/133 |
| 4,217,968 | 8/1980 | Dezelan | 60/404 X |
| 4,242,867 | 1/1981 | Belart | 137/110 X |

*Primary Examiner*—Robert G. Nilson

[57] ABSTRACT

A hydraulic fluid power steering system includes an accumulator which stores a reserve of pressure fluid at pump standby pressure. The charging and discharging of the accumulator is controlled by an emergency steering valve which is operable in response to a predetermined minimum fluid pressure outputted by the steering pump to discharge the stored fluid for emergency steering. The emergency steering valve also has components which serve as a pressure switch which is actuated to complete a circuit through an indicator light whenever the emergency steering valve moves to effect the discharge of the accumulator.

1 Claim, 1 Drawing Figure

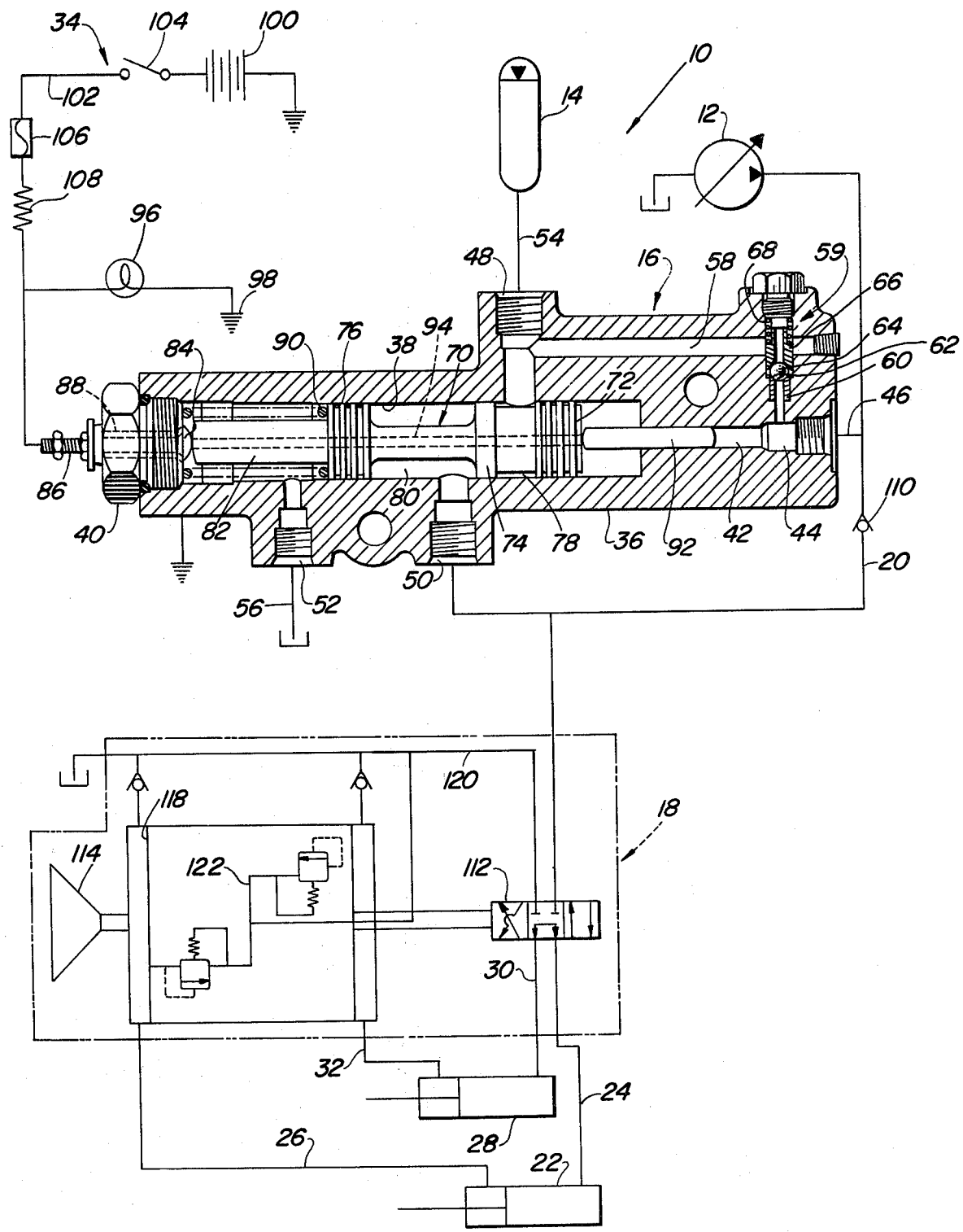

STEERING INCLUDING ACCUMULATOR FOR SUPPLYING EMERGENCY RESERVE OF FLUID

BACKGROUND OF THE INVENTION

The present invention relates to hydraulic fluid power steering systems and more particularly relates to such systems having an accumulator for supplying fluid in the event that the vehicle engine or primary fluid pressure source fails.

Industrial vehicles such as skidders, loaders and scrapers, or the like, are provided with hydraulic fluid power steering systems which make it possible for these large vehicles to be maneuvered with relative ease during normal operation. However, these vehicles become very difficult to maneuver once steering fluid pressure is lost. In order to diminish the safety hazard occasioned by the loss of power steering, it is a common practice, often required by law, for manufacturers to provide steering systems having some means for providing a reserve of steering fluid sufficient for an operator to maintain steering control at least until the vehicle is brought to a safe stop.

Heretofore, the most common way for providing a reserve of steering fluid for emergency steering has been to incorporate an accumulator into the main steering system. These accumulators have largely been of the bladder type and have usually been incorporated in such a way that their bladders expand and contract (cycle) during normal steering system operation in response to system pressure fluctuations. Such constant cycling significantly diminishes the useful life of the accumulators.

Also, it is a common practice to provide these systems with a pressure responsive indicator for apprising an operator of the fact that the steering fluid pressure supply pump is no longer providing adequate steering fluid pressure and that he should therefore take steps to bring the vehicle to a safe stop before the limited supply of emergency steering fluid is exhausted. Because the pressure of the fluid normally maintained in the accumulator is the standby pressure of the pressure supply pump and the pressure responsive indicator is set to respond at a value less than the lower limit of the expected system pressure fluctuations, the fluid pressure contained in the accumulator will be reduced from standby pressure to the indicator actuation pressure before the operator is aware that he is drawing on the reserve of fluid contained in the accumulator. Therefore, this amount of fluid is not available to the operator for use in bringing the vehicle to a safe stop and accordingly necessitates larger accumulators to be used than would be the case if their total reserve of fluid were available at the time the operator became aware that he had a loss of primary power steering fluid pressure.

One prior art steering system which appears to overcome the aforementioned problems attendant with the usual way of incorporating accumulators into steering systems is disclosed in U.S. Pat. No. 3,882,952 issued to Crabb on May 13, 1975. Specifically, the Crabb patent discloses an open center steering system incorporating an accumulator such that charging the accumulator with fluid and discharging fluid from the accumulator is controlled by an emergency steering valve such that the full charge of the accumulator is available for emergency steering. The emergency steering valve is "armed" automatically in response to a reduction in system pressure but is required to be shifted by means of a steering linkage in order to effect discharge of fluid from the accumulator for use in emergency steering operation.

SUMMARY OF THE INVENTION

According to the present invention, there is provided an improved steering system of the type employing an accumulator as a source of emergency steering fluid. Specifically, the steering system includes an emergency steering valve coupled to the accumulator, to the steering fluid pressure supply pump and to the main steering control valve and comprising a pressure responsive valve spool which occupies a normal or closed position wherein it prevents the discharge of fluid from the accumulator when the system pressure is above a predetermined minimum value and automatically shifts to an emergency or open position wherein it permits fluid to discharge from the accumulator to the main steering valve when the system pressure decreases to the predetermined minimum value. When the valve spool shifts to its emergency position, it completes an electrical circuit to an indicator which apprises the operator that the steering system is operating in an emergency steering mode.

It is an object of the invention to provide a hydraulic power steering system embodying an accumulator for holding a reserve of power steering fluid automatically made available for emergency steering purposes in a simple and reliable manner upon the loss of normal steering fluid pressure.

It is a more specific object of the invention to provide a pressure responsive emergency steering valve coupled for permitting the discharge of fluid from an accumulator holding a reserve of fluid for emergency steering only when the steering system pressure falls to a predetermined minimum value.

A further object of the invention is to provide a pressure-responsive emergency steering valve which operates to effect actuation of an emergency steering mode indicator upon the steering system pressure falling to a predetermined minimum value.

Yet another object is to provide a steering system embodying a bladder-type accumulator for holding a reserve of fluid for emergency steering purposes, the accumulator being embodied in the system such that the bladder thereof is flexed or cycled only once during the period between each start-up and shut-down of the vehicle engine during normal operation.

These and other objects will become apparent from a reading of the ensuing description together with the appended drawing.

BRIEF DESCRIPTION OF THE DRAWING

The sole FIGURE shows a longitudinal sectional view of the emergency steering valve embodied in a power steering system constructed in accordance with the present invention.

DESCRIPTION OF THE PREFERRED EMBODIMENT

Referring now to the drawing, therein is disclosed a power steering system indicated in its entirety by the reference numeral 10. The steering system 10 includes a pump 12 driven by the vehicle engine and connected to an accumulator 14 through the medium of an emergency steering valve 16. The pump 12 and valve 16 are connected to a fluid consumer circuit including a main steering valve 18 by a branched conduit 20 while the valve 18 is connected to a right-hand steering cylinder 22 by a supply-return conduit 24 and a return conduit 26, and is connected to a left-hand steering cylinder 28 by a supply-return conduit 30 and a return conduit 32.

As will be described in more detail below, the emergency steering valve 16 embodies structure which serves as a pressure switch forming part of a steering condition indicator circuit 34.

The emergency steering valve 16 includes a valve body 36 defining a valve bore 38 having its left-hand end closed by a threaded plug 40. A passage 42 is axially aligned with the bore 38 and defines a hydraulic fluid pressure inlet port 44, which is connected to the outlet of the pump 12 by a conduit 46. Intersecting the bore 38 at respective locations spaced leftwardly in serial order from the right-hand end of the bore are a charge-discharge port 48, a steering pressure fluid outlet port 50 and a sump port 52. The port 48 is connected to the accumulator 14 by a conduit 54 while a branch of the conduit 20 is connected to the port 50 and a conduit 56 connects the port 52 to sump.

Fluid is routed from the inlet port 44 to the accumulator 14 by way of the charge-discharge port 48 through an accumulator charge passage 58 having, as viewed in the drawing, a vertical section intersecting the passage 42 and a horizontal section intersecting the port 48. Mounted in the vertical section of the passage 58 is a one-way valve 59 comprising a first tubular member 60 fixed in the lower end of the vertical section and defining an upwardly facing valve seat 62, a check ball 64 located for engaging the seat, a second tubular member 66 axially shiftably mounted in vertical section above the check ball 64 and a coil compression spring 68 mounted above the member 66 and biasing the latter towards the member 60 so as to seat the ball 64 thereagainst in the absence of sufficient fluid pressure at the inlet port for overcoming the force of the spring 68. Thus, it will be appreciated that the one-way valve 59 acts to permit fluid to flow from the inlet port to the accumulator but not in the opposite or reverse direction.

Axially shiftably mounted in the bore 38 for controlling the flow of fluid between the ports 48 and 50 is a valve spool 70. Specifically, the spool 70 has a land 72 at its right-hand end, an intermediate land 74 spaced leftwardly from the land 72 and a land 76 spaced leftwardly from the land 74. A relatively shallow recess 78 exists between the lands 72 and 74 while a much deeper recess 80 exists between the lands 74 and 76. Projecting leftwardly from the land 76 and forming the left end of the spool 70 is a stem 82 which, during normal steering conditions, is in a normal operating position wherein it is in engagement with a head 84 of a screw 86 extending axially through the plug 40, the head 84 and the stem 82 forming opposite contacts of a normally closed switch of the circuit 34. The screw 86 is electrically insulated from the plug 40 by insulation 88. A coil compression spring 90 is compressed between the plug 40 and a leftwardly facing annular surface of the land 76 and acts in opposition to any force as might be exerted on the right-hand end of the spool by a pin 92 reciprocably mounted in the passage 42 and having its right-hand end exposed to system pressure at the inlet port 44. To ensure free movement of the spool 70, a passage 94 extends axially through the spool and is in constant fluid communication with the sump port 52.

When the spool 70 is in its normal operating position, as illustrated, the land 74 is located between the charge-discharge port 48 and the outlet port 50 and thus prevents discharge of the accumulator 14. However, upon the pressure at the inlet port 44 falling to a predetermined minimum value, which is less than the lowest pressure expected during normal system pressure fluctuations, the spring 90 will overcome the force exerted by the pin 92 and shift the spool 70 rightwardly to a reserve fluid supplying position so as to dispose the land 74 at a location rightwardly of the port 48 to thus connect the port 48 to the port 50. The accumulator 14 is then connected for discharging its reserve of fluid pressure for use in emergency steering operation.

The operator is made aware or apprised of the fact that the pressure in the system has fallen below that for normal operation and that the system is operating in an emergency steering mode with the accumulator 14 supplying the steering fluid by actuation of an indicator light 96 connected in the circuitry 34. Specifically, the light 96 is connected to ground at 98 in parallel with the normally closed pressure switch formed by the screw 86 and the spool stem 82. A source of electrical current here shown in the form of a battery 100 is connected to a power lead 102 in which is located an on-off switch 104 that is preferably embodied in the vehicle ignition switch such as to be closed anytime the vehicle engine is running. Connected in the lead 102 in series with each other and the switch 104 are a fuse 106 and a power loss minimizing resistor 108. Thus, it will be appreciated that under normal operating conditions, with the stem 82 engaging the screw head 84, a grounding circuit will be completed which bypasses the light 96. However, upon there being a loss of pressure sufficient that the spring 90 disengages the stem 82 from the screw head 84, the current ground path will be interrupted and current will then flow through and activate the light 96. It is here noted that the pressure provided by the accumulator is isolated from the inlet port 44 by a one-way valve 110 located in that branch of the conduit 20 which is connected to the output of the pump 12.

The main steering valve 18 is of a conventional construction including a direction control valve section 112 connected to a steering wheel 114 operable to effect a pressure imbalance on a piston 118 such that the latter shifts the valve 112 leftwardly during clockwise rotation of the wheel 114 so as to connect the fluid pressure in the conduit 20 to the head end of the right-hand steering cylinder 22 while connecting the head end of the left-hand steering cylinder 24 to a sump-connected conduit 120; and to effect a pressure imbalance of the piston 118 such that the latter shifts the vale 112 rightwardly during counterclockwise rotation of the wheel 114 so as to connect the fluid pressure in the conduit 20 to the head end of the left-hand steering cylinder while connecting the head end of the right-hand steering cylinder to the sump-connected conduit 120. A relief valve system 122 operates to relieve pressure from the rod ends of the cylinders 22 and 24 during turning of the steering wheel 114 so as to ensure free movement of the pistons of the steering cylinders to effect the desired steering.

The operation of the steering system is briefly stated as follows. Before the vehicle engine is started, the pump 12 will not be delivering any fluid and the system pressure will be below the predetermined minimum pressure required to maintain the value spool 70 of the emergency steering valve 16 in its normal operating position as illustrated. Thus, the spool 70 will be in an initial position wherein the right-hand end thereof is against the right-hand end of the bore 38. The land 74 is rightwardly of the accumulator charge-discharge port 48 and accordingly the accumulator 14 is connected to the pressure fluid supply conduit 20 via the outlet port 50.

When the vehicle engine is started, the pump 12 will be driven and will begin to increase the pressure of the fluid in the conduits 46 and 20. Inasmuch as the conduit is connected to the inlet 44, the fluid pressure at the inlet 44 will likewise increase. When the pressure at the inlet 44 rises to the extent that the force exerted by the pin 92 on the right-hand end of the valve spool 70 overcomes the resisting force exerted on the spool 70 by the spring 90, the spool 70 will shift leftwardly to engage the stem 82 with the screw head 84. The land 74 will now be between the accumulator charge-discharge port 48 and the outlet port 50 to thus prevent discharge from the accumulator 14, and the pressure switch having contacts defined by the stem 82 and screw head 84 will be closed so that the indicator light 96 is de-energized. At the same time, the check ball 64 of the one-way valve 59 will be open and the accumulator 14 will continue to be charged with fluid. The fluid pressure supplied by the pump 12 will rise until the standby pressure of the pump is reached. Accordingly, the accumulator 14 will become charged to the standby pressure of the pump. When this pressure is reached, the system pressure at the opposite ends of the upper tubular member 66 of the one-way valve 59 will equalize, resulting in the spring 68 acting through the member 66 to seat the ball 59. The fluid in the accumulator 14 is thus held at standby pressure until the valve spool 70 again shifts rightwardly to open a flow path between the ports 48 and 50.

Assuming that for some reason, such as an engine or pump failure for example, the fluid pressure at the inlet port 44 falls to a predetermined minimum value where the force exerted on the valve spool 70 by the pin 92 becomes less than that exerted by the spring 90, the spool will begin to shift to the right. At the instant the spool begins to move, the pressure switch contacts, defined by the stem 82 and screw head 84, will open to thereby effect a flow of current through and thus the energization of the indicator light 96. The operator will then be apprised of the fact that the system 10 is in its emergency steering mode. The pressure at which this occurs must be set below the level of pressure fluctuations normally expected in the steering circuit and may be pre-selected or adjusted by shimming the spring 90, changing the spring rate or varying the cross-sectional area of the pin 92. As the pressure continues to drop to a level below the predetermined minimum value like it would in the event of an engine or steering pump failure, the spool 70 will shift rightwardly to its open position against the end of the bore 38 wherein the land 74 is to the right of the port 48 to thus permit flow between the ports 48 and 50 and accordingly to permit the release of fluid stored in the accumulator 14. This pressure fluid enables the operator to steer the vehicle for the purpose of bringing the latter to a safe stop. The pressure of the released fluid is blocked from the inlet port 44 by the check valve 110 and thus has no effect on the operation of the valve spool 70 nor on the operating of the indicator circuit 34.

What is claimed is:

1. A reserve fluid supply system, comprising: a reserve fluid control valve including a valve bore having first and second ends; a plug being in the first end of the bore and including a first switch contact; a valve spool shiftably mounted in the bore and including a first end portion defining a second switch contact located for engagement with the first contact when the valve spool is in a normal operating position; a first passage extending axially into the second end of the bore and having an end portion defining an inlet port remote from the bore; a pin reciprocably mounted in the first passage and having one end engaged with the valve spool and an opposite end exposed to the inlet port; a source of fluid pressure connected to the inlet port; a fluid consumer circuit connected to the source of fluid pressure; first and second ports intersecting the bore between the first and second ends of the bore; and accumulator connected to the first port; said fluid consumer circuit being connected to the second port; a spring mounted in the bore between the first end of the latter and the valve spool and biasing the spool towards the second end of the bore; said pin and spring cooperating to permit the valve spool to shift from its normal operating position toward the second end of the bore to a reserve fluid supplying position only upon the pressure at the inlet port falling to a predetermined minimum value; an indicator circuit means embodying the first and second contacts and including an indicator means which becomes energized whenever the contacts become disengaged from each other; and said valve spool including land means for preventing fluid flow between the first and second ports when the spool is in its normal operating position and for establishing a fluid flow path between the first and second ports when the spool is in its reserve fluid supplying position.

* * * * *